(12) United States Patent
Lee et al.

(10) Patent No.: US 6,845,079 B2
(45) Date of Patent: Jan. 18, 2005

(54) HIGH-SPEED OPTICAL RECORDING AND ERASING METHOD AND APPARATUS USING TWO BEAMS

(75) Inventors: Kyung-geun Lee, Seongnam-si (KR); In-sik Park, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 575 days.

(21) Appl. No.: 09/900,462

(22) Filed: Jul. 9, 2001

(65) Prior Publication Data

US 2002/0105883 A1 Aug. 8, 2002

(30) Foreign Application Priority Data

Dec. 7, 2000  (KR) ........................................ 2000-74311

(51) Int. Cl.[7] ................................................ G11B 7/00
(52) U.S. Cl. ................. 369/124.03; 369/53.26
(58) Field of Search ............................ 369/47.5, 47.51, 369/47.52, 53.26, 124.03

(56) References Cited

U.S. PATENT DOCUMENTS 4,566,088 A * 1/1986 Yoshida et al. .......... 369/44.38
4,679,184 A * 7/1987 Yoshida et al. ........ 369/112.09
4,710,911 A * 12/1987 Yamada et al. ............. 369/100
4,818,666 A * 4/1989 Gravesteijn et al. .......... 430/19
4,980,879 A * 12/1990 Yamada et al. ............. 369/100

FOREIGN PATENT DOCUMENTS

| JP | 01-138620 | 5/1989 |
| JP | 01-229425 | 9/1989 |
| JP | 02-177131 | 7/1990 |
| JP | 03-296922 | 12/1991 |
| JP | 05-342582 | 12/1993 |

\* cited by examiner

*Primary Examiner*—Paul W. Huber
(74) *Attorney, Agent, or Firm*—Stein, McEwen & Bui LLP

(57) ABSTRACT

An optical recording method and apparatus in which a main light spot and a secondary light spot at a predetermined distance ahead of the main light spot in a track direction along which an optical disc rotates are formed on an optical disc. When a mark is recorded by the main light spot in response to a recording signal, an existing mark is partially erased by the secondary light spot during a recording signal period and then completely erased by the main light spot during an erasing signal period. Accordingly, an optimal erasing ratio can be obtained even during fast erasing. Therefore, in the present invention, a mark can be fast recorded on the optical disc, and fast mark recording can be achieved in an optical disc having no special crystallization accelerating layers for accelerating erasing.

33 Claims, 6 Drawing Sheets

Pe-pulse=2.2mW

Pe-pulse=3.0mW

Pe-pulse=5.0mW

HIGH-SPEED OPTICAL RECORDING AND ERASING METHOD AND APPARATUS USING TWO BEAMS

CROSS-REFERENCE TO RELATED APPLICATIONS

This application claims the benefit of Korean Application No. 2000-74311, filed Dec. 7, 2000, in the Korean Patent Office, the disclosure of which is incorporated herein by reference.

BACKGROUND OF THE INVENTION

1. Field of the Invention

The present invention relates to a high-speed optical recording method and apparatus where marks can be erased at an optimal erasing rate even at high speed.

2. Description of the Related Art

Generally, optical recording/reproducing apparatuses use a single semiconductor laser to record a mark on an optical disc, and record an information signal on the optical disc by driving the semiconductor laser in a multi-pulse form according to the length of the mark to be recorded. For example, a phase change optical disc capable of repetitively recording is used as the optical disc, so that the recording of the mark is performed while erasing an existing mark previously recorded on the optical disc. Thus, an erasing signal is located on a period between recording signals, which corresponds to a length of the mark to be recorded.

Because the recording density is on an increasing trend and a high data transfer rate is demanding, a high recording rate is required and a fast erasing must be possible in order to obtain a high recording rate. However, because recording and erasing on the optical disc are generally performed by moving a single light spot emitted from the semiconductor laser and focused by an objective lens along a track, the light spot must move slower when erasing than when recording in order to achieve a desired erasing ratio, which is proportional to the time of radiation of the light spot. Hence, it is difficult to achieve fast erasing that satisfies a required high recording speed.

Fast erasing may be achieved by changing the structure of the optical disc. In existing systems, a crystallization accelerating layer is stacked on the upper and lower surfaces of a recording layer of the optical disc has been proposed in order to improve the erasing ratio of a recorded mark. However, the thus-structured optical disc requires an increase in the number of stacks, thereby creating disadvantages in terms of yield and mass, production. Also, while crystallization is achieved well due to the existence of a crystallization accelerating layer, an adjacent track in the optical disc is affected by the crystallization during recording. Specifically, the mark recorded on the adjacent track is erased.

SUMMARY OF THE INVENTION

To solve the above problems, an objective of the present invention is to provide an optical recording method and apparatus by which a mark can be erased fast even when an optical disc has no special crystallization accelerating layers for accelerating erasing.

To achieve the above and other objects, the present invention provides an optical recording method, including: producing a main beam and a sub beam; forming a main light spot on an optical disc by projecting the main beam on the optical disc; forming a secondary light spot on the optical disc by projecting the sub beam onto the optical disc at a predetermined distance ahead of the main light spot in a track direction along which the optical disc rotates; recording a new mark and erasing an existing mark using the main light spot; and supporting erasing of the existing mark using the secondary light spot during mark recording and/or erasing.

To achieve the above and other objects, the present invention provides an optical recording method, including: producing a main beam and a sub beam; forming a main light spot on an optical disc by projecting the main beam on the optical disc; forming a secondary light spot on the optical disc by projecting the sub beam onto the optical disc at a predetermined distance ahead of the main light spot in a track direction along which the optical disc rotates; supporting erasing of an existing mark using the secondary light spot during mark recording and/or erasing by partially erasing the existing mark while emitted at the predetermined distance ahead of the main light spot; completely erasing the existing mark partially erased by the secondary light spot during a recording signal period using the main light spot; and recording a new mark using the main light spot at a position of the erased mark.

Further, the secondary light spot partially erases the existing mark while emitted at the predetermined distance ahead of the main light spot in the track direction along which the optical disc rotates during a recording signal period, and the main light spot completely erases the existing mark partially erased by the secondary light spot during the recording signal period.

To achieve the above and other objects, the present invention provides optical recording apparatus, including: a light source unit emitting a main beam to form a main light spot on an optical disc and emitting a sub beam to form a secondary light spot on the optical disc at a predetermined distance ahead of the main light spot in a track direction along which the optical disc rotates; and an objective lens focusing the main beam and the sub beam on a recording surface of the optical disc, wherein the main light spot records a new mark and erases an existing mark, and the secondary light spot supports the erasing of the existing mark during mark recording and/or erasing.

According to an aspect of the present invention, the light source unit includes: a light source producing and emitting light; and an optical branching device branching the light emitted from the light source into the main beam and the sub beam.

According to another aspect of the present invention, the light source unit includes first and second light sources positioned in the track direction of the optical disc and emitting the main beam and the sub beam, respectively.

Further, an optical erasing power of the main beam, Pme, and an optical erasing power of the sub beam, Pse, satisfy: $Pme \leq Pse$. The optical erasing power of the main beam, Pme, is an invariable power including a predetermined magnitude, and the optical erasing power of the sub beam, Pse, is pulse-formed power.

Also, the main light spot and the secondary light spot projected on the optical disc are sufficiently separated from each other where the secondary light spot does not affect an area to be recorded on by the main light spot while erasing the existing mark. The predetermined distance between the main light spot and the secondary light spot on the optical disc is greater than a length of a minimum recording mark.

These together with other objects and advantages, which will be subsequently apparent, reside in the details of construction and operation as more fully hereinafter described and claimed, reference being had to the accompanying drawings forming a part hereof, wherein like numerals refer to like parts throughout.

BRIEF DESCRIPTION OF THE DRAWINGS

The above objective and advantage of the present invention will become more apparent by describing in detail preferred embodiments thereof with reference to the attached drawings in which.

DESCRIPTION OF THE PREFERRED EMBODIMENTS

Figure 1:
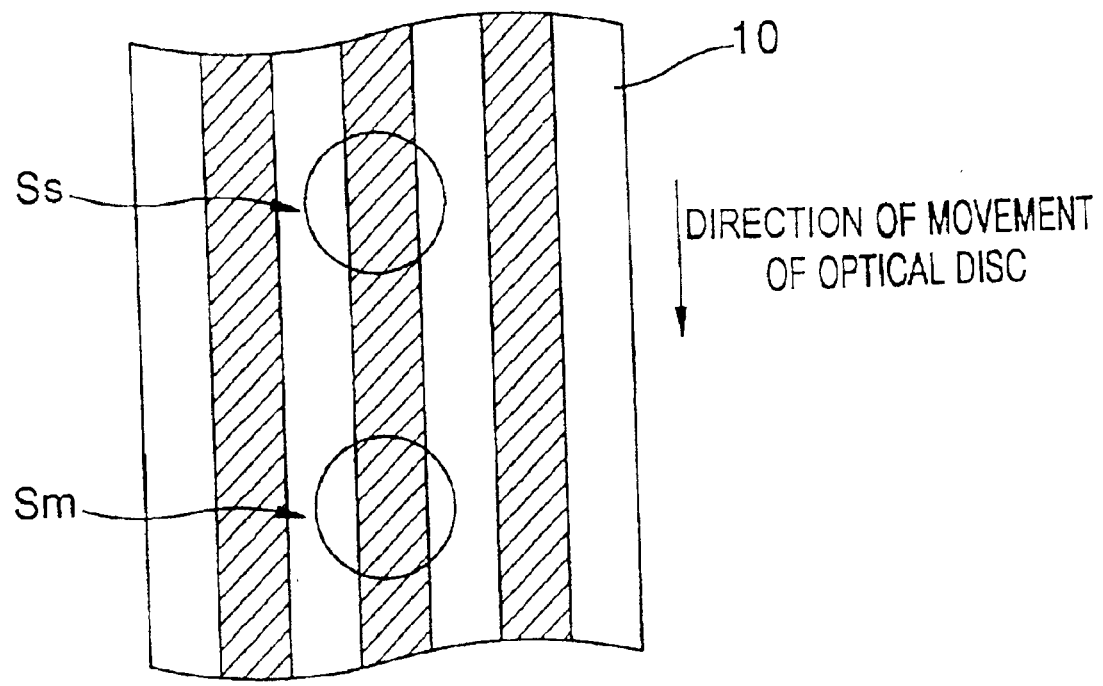
FIG. 1 is a diagram illustrating a part of an area of an optical disc on which a main light spot, Sm, and a secondary light spot, Ss, are formed in a track direction.

Referring to FIG. 1, a fast mark recording and/or erasing apparatus, in accordance with an exemplary embodiment of to the present invention, uses a main light spot, Sm, formed on an optical disc 10 and a secondary light spot, Ss, which is radiated or emitted at a predetermined distance ahead of the main light spot, Sm, along a track direction. The main light spot, Sm, is used to record and to erase an existing mark and the secondary light spot, Ss, is used to support the erasing of the mark performed by the main light spot, Sm.

In an exemplary embodiment, the main light spot, Sm, and the secondary light spot, Ss, on the optical disc 10 are sufficiently separated from each other so that the secondary light spot, Ss, does not affect the recording area to be irradiated by the main light spot, Sm, while erasing the existing mark. To be more specific, preferably, the distance between the main light spot, Sm, and the secondary light spot, Ss, on the optical disc 10 is greater than a minimum recording mark length, for example, 3T.

A main beam I and a sub beam II are emitted by a light source, to be later described, and form the main light spot, Sm, and the secondary light spot, Ss, respectively, on the surface of the optical disc 10. Also, an optical erasing power of the main beam I and an optical erasing power of the sub beam II satisfy the following equation:

$$Pme \leq Pse \qquad (1)$$

where Pme denotes the optical erasing power of the main beam I and Pse denotes the optical erasing power of the sub beam II. Here, the optical erasing power of the main beam I is an invariable value of a predetermined magnitude (hereinafter, referred to as optical DC erasing light power, Pe), and the optical erasing power of the sub beam II has a pulse form that is the same as the pulse form of a recording signal.

Figure 2:
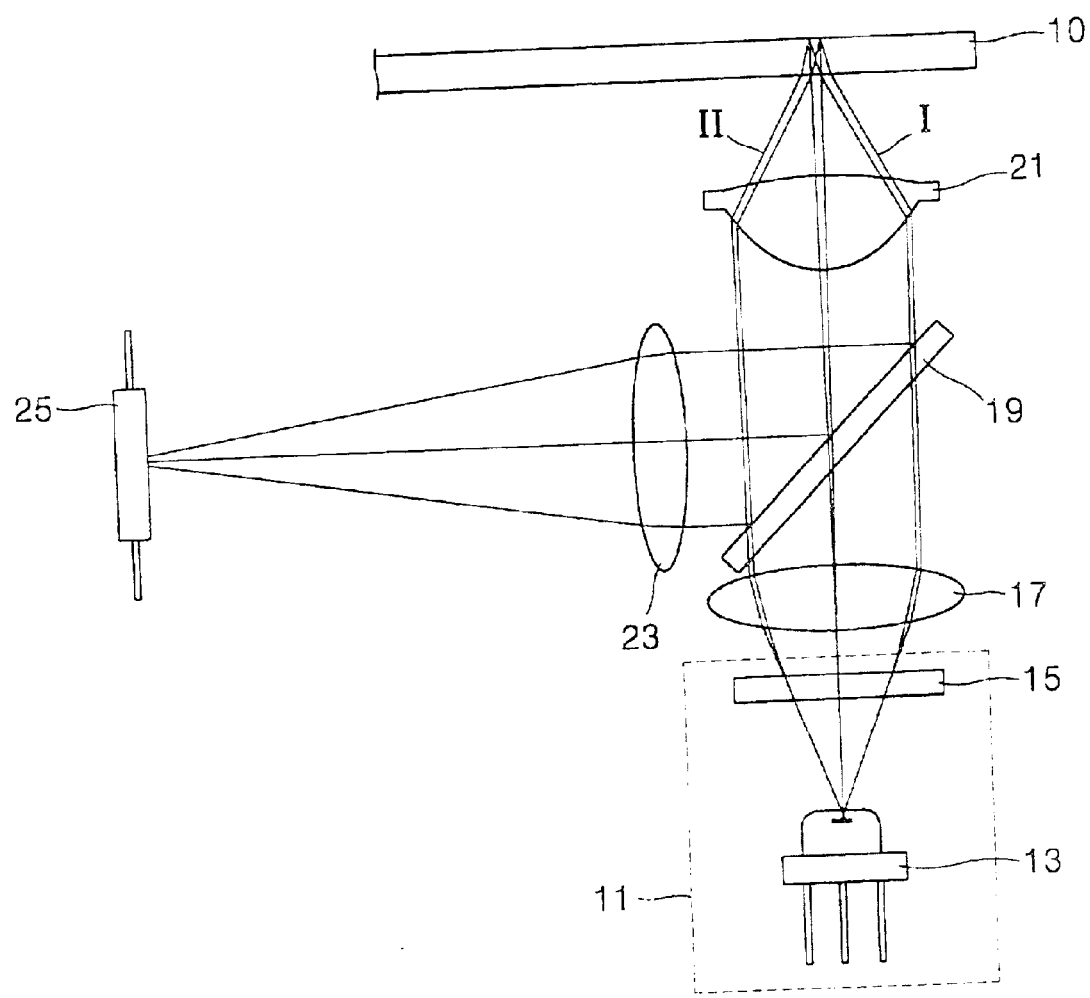
FIG. 2 is a schematic diagram of an optical structure of an optical pickup in an optical recording apparatus in accordance with an exemplary embodiment of the present invention.

FIG. 2 is a schematic diagram of a structure of an optical pickup in an optical recording apparatus, in accordance with an exemplary embodiment of the present invention. As shown in FIG. 2, in order to form the main light spot, Sm, and the secondary light spot, Ss, on the optical disc 10, the optical recording apparatus includes a light source unit 11 to produce the main beam I and the sub beam II. An objective lens 21 focuses the main beam I and the sub beam II received from the light source unit 11 so that the main light spot, Sm, and the secondary light spot, Ss, are formed on the optical disc 10.

The light source unit 11 includes a light source 13 to produce and to emit light and an optical branching device 15 to branch the light emitted from the light source 13 into the main beam I and the sub beam II. The main beam I and the sub beam II branched by the optical branching device 15 are focused by the objective lens 21 and incident on the optical disc 10 forming as the main light spot, Sm, and the secondary light spot, Ss, respectively. The secondary light spot, Ss, is at a predetermined distance ahead of the main light spot, Sm, in the track direction along which the optical disc 10 rotates. In an exemplary embodiment, the optical branching device 15 can be a hologram element or a grating.

The light source 13 outputs light (mW) having power that satisfies the following equation:

$$Pt=(Pm+Ps)/\alpha, \ 0 \leq \alpha \leq 99 \qquad (2)$$

where Pt denotes a total of light power output from the light source 13, Pm denotes the power of the main beam I, Ps denotes the power of the sub beam II, and α denotes a degradation in light efficiency caused by the branching of light into two beams.

Referring to FIG. 2, the optical pickup further includes a collimating lens 17, a beam splitter that is an optical path changer 19, a sensing lens 23, and a photo detector 25. The collimating lens 17 collimates diverging light emitted from the light source 13 and outputs the collimated light to the objective lens 21. The optical path changer 19 changes the path of incident light so that the light received from the light source 13 is projected to the optical disc 10, and the light reflected from the optical disc 10 is subsequently projected to the photo detector 25. The sensing lens 23 focuses the light reflected from the optical disc 10, passing through the objective lens 21, and reflected from the optical path changer 19 to the photo detector 25. The photo detector 25 has a light receiving surface for receiving the main beam I reflected by the optical disc 10. The sub beam II reflected by the optical disc 10 and incident upon the photo detector 25 is not shown in FIG. 2 because the sub beam II is not used to detect a reproducing signal.

Hence, the optical pickup in the optical recording apparatus according to the present invention performs fast mark recording and erasing and also detects the reproducing signal by the photo detector 25 receiving the main beam I reflected by the optical disc 10.

According to the optical recording apparatus of the present invention as described above, fast erasing is accomplished at a sufficient erasing ratio as described below. The sub beam II is radiated at a predetermined distance ahead of the main beam I in the track direction along which the optical disc 10 rotates. Thus, in the above-described structure in which the main beam I and the sub beam II are emitted from the single light source 13 and branched, the secondary light spot, Ss, partially erases the existing mark while radiated at a predetermined distance ahead of the main light spot, Sm, during a recording signal period of a pulse form. The secondary light spot, Ss, is formed by branching pulse-type light output from the light source 13 during a recording signal period, so that the secondary light spot, Ss, has a pulse form having the same variation as a recording signal. Therefore, because the main light spot, Sm, completely erases the existing mark during an erasing signal period, partially erased by the secondary light spot, Ss, and records a new mark at a position of the erased mark during the recording signal period, an optimal erasing ratio can be obtained even during fast recording and/or erasing.

Figure 3:
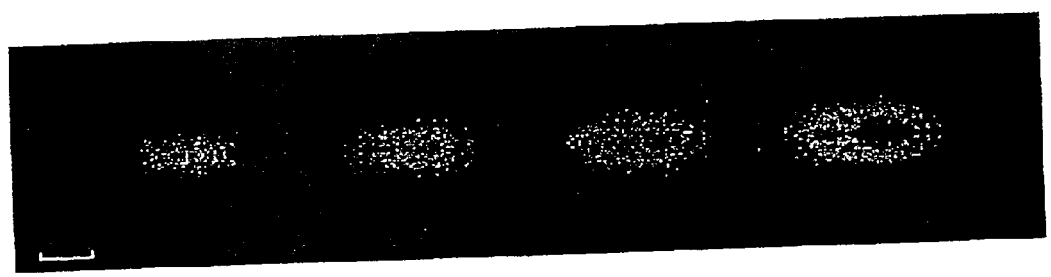
FIG. 3 is a diagram illustrating an erasing effect varying according to a variation in DC erasing light power.
Figure 4:
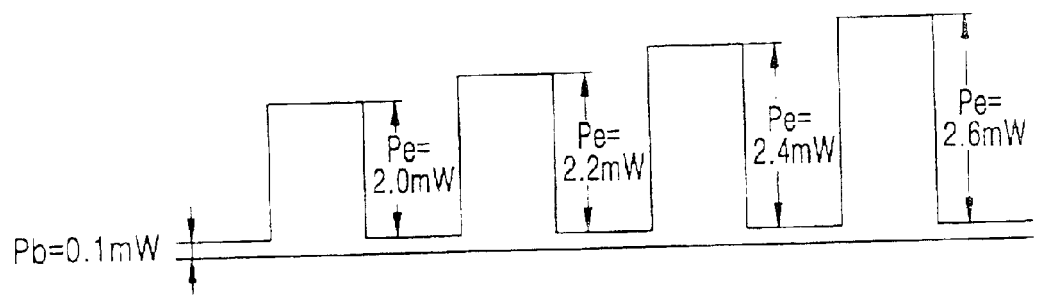
FIG. 4 is a diagram illustrating different magnitudes of the DC erasing light power applied to obtain the erasing effects illustrated in FIG. 3.

FIG. 3 is a diagram illustrating the erasing effect varying according to the DC erasing light power, Pe. The amorphous state of the optical disc 10 varies according to the DC erasing light power, Pe, which is the light power on the incident surface of the optical disc 10, when an optical system including the light source 13 emitting a 405 nm-wavelength light and the objective lens 21 having a 0.65 numerical aperture is adopted. As shown in FIG. 4, the results of FIG. 3 are obtained by varying the DC erasing light power, Pe, by 2.0 mW, 2.2 mW, 2.4 mW and 2.6 mW with respect to 0.1 mW bias power, Pb.

As can be seen from FIG. 3, crystallization proceeds well with an increase in the DC erasing light power, Pe, but the optical disc becomes rather amorphous at 2.6 mW DC erasing light power, Pe. The optical disc becomes amorphous because the erasing light power exceeds a reasonable level and exceeds a temperature where recording can be performed. Therefore, a reasonable DC erasing light power, Pe, is 2.2 mW to 2.4 mW.

Figure 5A:
FIGS. 5A through 5C illustrate different degrees to which a mark is erased according to varying erasing pulse signals.
Figure 5B:
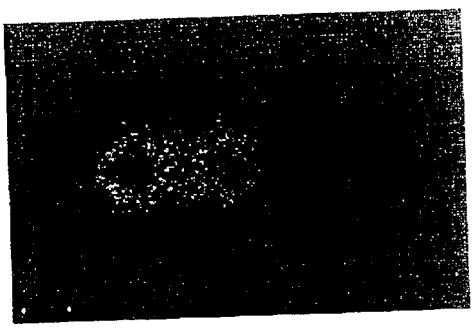
Figure 5C:
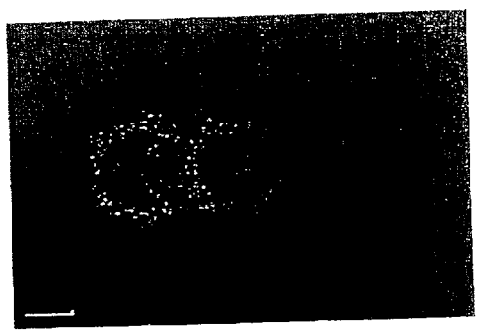
Figure 6:
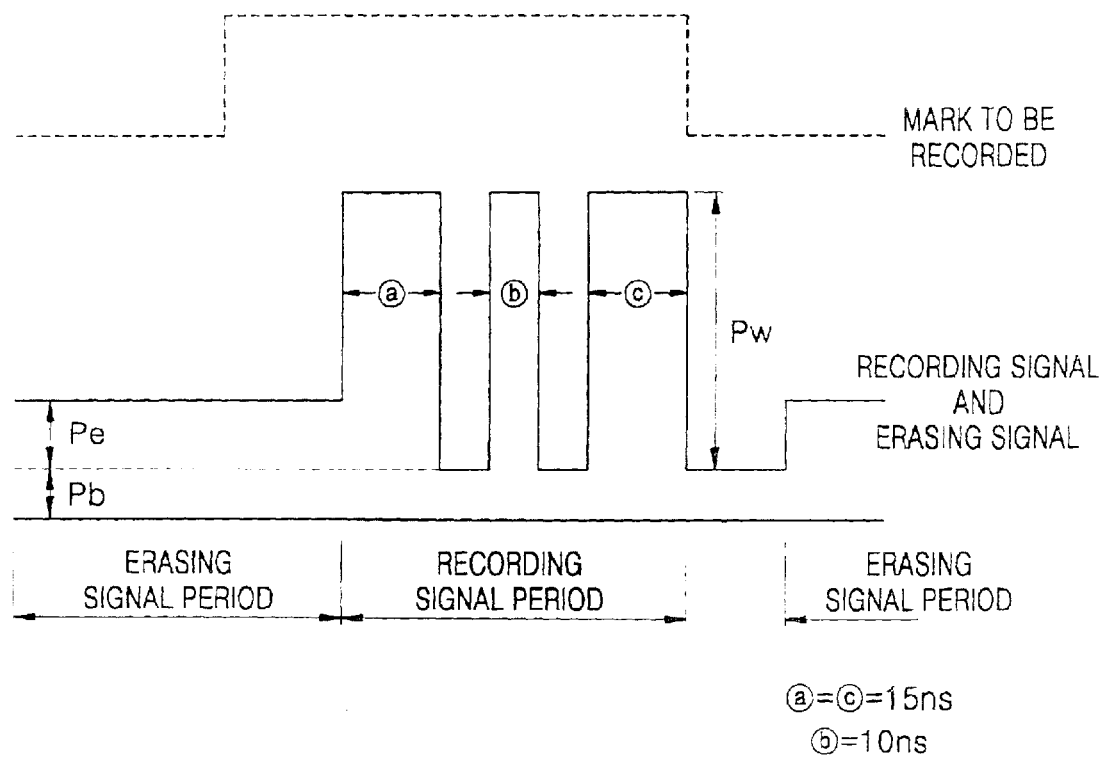
FIG. 6 is a graph showing an example of an erasing signal and a recording signal.

FIGS. 5A through 5C illustrate different degrees to which a mark is erased according to varying erasing pulse signals. The results of FIGS. 5A through 5C are obtained from 2.2 mW, 3.0 mW and 5.0 mW pulse-shaped erasing light power signals, Pe-pulse, which is the secondary light spot, Ss, during the recording signal a position in the optical disc 10 where a 4T mark is recorded at a 5.84 m/s linear velocity. A pulse-type recording signal illustrated in FIG. 6 having 405 nm-wavelength light and an objective lens 21 having a 0.65 numerical aperture are used to illustrate the different degrees to which the mark is erased. The minimum mark length 3T is 0.30 µm. In FIG. 6, a recording signal having a smaller width than the length of a nominal mark is applied in consideration of dispersion due to temperature of the mark formed by a phase change.

Table 1 shows a variation in carrier level (C/L) when DC erasing light power, Pe, and pulse-shaped erasing light power, Pe-pulse, are applied, as shown in FIGS. 3 and 4. The results of Table 1 are obtained with a 5.84 m/s linear velocity, 6.5 mW recording light power, Pw, 2.2 mW erasing light power, Pe, 0.3 mW bias light power, Pw, 0.4 mW reproducing light power, Pr, and a 54.0 dB carrier to noise ratio (C/N). Here, the carrier level is obtained by analyzing the reproducing signal of the mark using a spectrum analyzer and expressing the reproducing signal of the mark in dBm.

TABLE 1

|  | initial mark | Pe =2.2 mW | Pe-pulse = 2.2 mW | Pe-pulse = 5.0 mW |
|---|---|---|---|---|
| C/L | −30 dBm | −60 dBm | −33 dBm | −45 dBm |

Referring to Table 1, the carrier level of the initial 4T mark to which erasing light power has not been yet applied is −30 dBm. When reasonable DC erasing light power, Pe, of 2.2 mW is applied to the 4T mark, erasing is properly performed and the carrier level of the power-applied portion is reduced to −60 dBm. On the other hand, when 2.2 mW pulse-shaped erasing light power, Pe-pulse, which is the same size as the reasonable DC erasing light power, Pe, is applied to the 4T mark, the carrier level of the power-applied portion of the mark is −33 dBm. This carrier level means that the erasing is hardly performed. However, when 5.0 mW pulse-shaped erasing light power, Pe-pulse, is applied to the 4T mark, the carrier level of the power-applied portion of the mark decreases to −45 dBm. Thus, if the power-applied portion of the mark is completely erased by the reasonable DC erasing light power, Pe, of 2.2 mW, a sufficient erasing ratio can be obtained.

Accordingly, if the mark is partially erased by the pulse-typed secondary light spot, Ss, having reasonable power during a recording signal period and then completely erased by the main light spot, Sm, during an erasing signal period, as in the present invention, a sufficient erasing ratio can be obtained even during fast erasing.

In the above, an optical recording apparatus, in accordance with an exemplary embodiment of the present invention, includes the light source unit 11, having the light source 13 and the optical branching device 15 for branching light emitted from the light source 13 into the main beam I and the sub beam II has been described. However, as shown in FIG. 7, an optical recording apparatus in accordance with an alternative embodiment of the present invention may include a light source unit 30 including first and second light sources 31 and 33 installed adjacent to each other so that the optical branching device 15 of FIG. 2 can be omitted.

Figure 7:
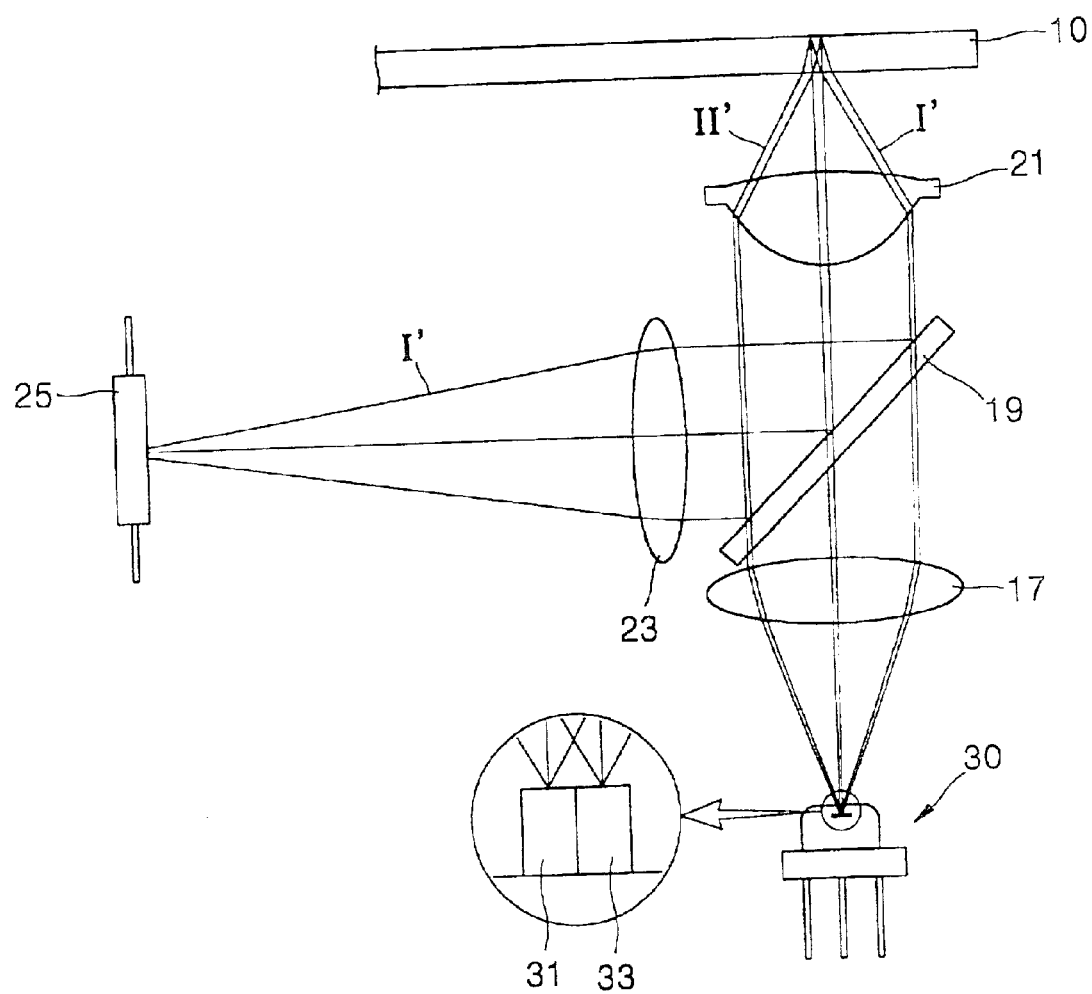
FIG. 7 is a schematic diagram of the optical structure of an optical pickup in an optical recording apparatus in accordance with an alternative exemplary embodiment of the present invention.

As shown in FIG. 7, the first and second light sources 31 and 33 are separated from each other so that a main beam I' and a sub beam II" emitted therefrom radiate on the optical disc 10 a main light spot, Sm, and a secondary light spot, Ss, respectively. The secondary light spot, Ss, is at a predetermined distance ahead of the main light spot, Sm, along information rows on the optical disc 10. The recording area to be irradiated by the main light spot, Sm, is not affected by the secondary light spot Ss. In an exemplary embodiment, the first light source 31 is arranged along the optical axis because the main beam I' emitted therefrom is used to record information and to detect a reproducing signal. The sub beam II", which is reflected by the optical disc 10 and is directed to the photo detector 25, is not shown because the sub beam II" is not used to detect a reproducing signal.

In case that the first and second light sources 31 and 33 operate in synchronization with each other, if the first and second light sources 31 and 33 output light power having the same form but different magnitudes, the main light spot, Sm, and the secondary light spot, Ss, formed by focusing the main beam I' and the sub beam II", respectively, from the first and second light sources 31 and 33 are used to record and/or erase in substantially the same manner as described in the previous embodiment. Specifically, the light emitted from the single light source 13 is branched into the main beam I and the sub beam II.

On the other hand, in case that the first and second light sources 31 and 33 operate independently, while the first light source 31 outputs pulse-formed recording light power, the second light source 33 can be driven to output DC erasing light power. In this case, an existing mark is partially erased by the secondary light spot, Ss, having DC erasing light power from the second light source 33 and then completely erased by the main light spot, Sm, having DC erasing light power from the first light source 31, so that a sufficient erasing ratio during fast erasing is also obtained.

According to the present invention as described above, a main light spot and a secondary light spot radiated at a predetermined distance ahead of the main light spot in the track direction of an optical disc are formed on the optical disc, and, while a mark is recorded by the main light spot in response to a recording signal, an existing mark is partially erased by the secondary light spot during a recording signal period and then completely erased by the main light spot during an erasing signal period. Thus, an optimal erasing ratio can be obtained even during fast mark recording and/or erasing. In the present invention, the mark can be fast recorded on an optical disc, and fast mark recording can be achieved in the case of the optical disc having no special crystallization accelerating layers for accelerating erasing.

While this invention has been particularly shown and described with reference to preferred embodiments thereof, it will be understood by those skilled in the art that various changes in form and details may be made thereto without departing from the spirit and scope of the invention as defined by the appended claims.

What is claimed is:

1. An optical recording method for an optical disc, comprising:
    producing a main beam and a sub beam such that the main beam is synchronized with the sub-beam;
    forming a main light spot on the optical disc by projecting the main beam on the optical disc;
    forming a secondary light spot on the optical disc by projecting the sub beam onto the optical disc at a predetermined distance ahead of the main light spot in a track direction along which the optical disc rotates;
    recording a new mark and erasing an existing mark using the main light spot; and
    supporting erasing of the existing mark using the secondary light spot during mark recording and/or erasing.

2. The optical recording method as recited in claim 1, wherein an optical erasing power of the main beam, Pme, and an optical erasing power of the sub beam, Pse, satisfy:

$Pme \leq Pse$.

3. The optical recording method as recited in claim 1, wherein the main light spot and the secondary light spot projected on the optical disc are sufficiently separated from each other where the secondary light spot does not affect an area to be recorded on by the main light spot while erasing the existing mark.

4. The optical recording method as recited in claim 3, wherein the predetermined distance between the main light spot and the secondary light spot on the optical disc is greater than a length of a minimum recording mark.

5. An optical recording method for an optical disc, comprising:
    producing a main beam and a sub beam;
    forming a main light spot on the optical disc by projecting the main beam on the optical disc;
    forming a secondary light snot on the optical disc by projecting the sub beam onto the optical disc at a predetermined distance ahead of the main light spot in a track direction along which the optical disc rotates;
    recording a new mark and erasing an existing mark using the main light spot; and
    supporting erasing of the existing mark using the secondary light spot during mark recording and/or erasing, wherein;
        an optical erasing power of the main beam, Pme, and an optical erasing power of the sub beam, Pse, satisfy:
        $Pme \leq Pse$, and
        the optical erasing power of the main beam, Pme, is an invariable power comprising a predetermined magnitude, and the optical erasing power of the sub beam, Pse, is pulse-formed power.

6. An optical recording method for an optical disc, comprising:
    forming a main light spot on the optical disc by projecting a main beam on the optical disc;
    forming a secondary light spot on the optical disc by projecting a sub beam onto the optical disc at a predetermined distance ahead of the main light spot in a track direction along which the optical disc rotates, the sub beam being synchronized with the main beam;
    supporting erasing of an existing mark using the secondary light spot during mark recording and/or erasing by partially erasing the existing mark while emitted at the predetermined distance ahead of the main light spot;
    completely erasing the existing mark partially erased by the secondary light spot using the main light spot; and
    recording a new mark using the main light spot at a position of the erased mark.

7. An optical recording apparatus, comprising:
    a light source unit emitting a main beam to form a main light spot on an optical disc and emitting a sub beam to form a secondary light spot on the optical disc at a predetermined distance ahead of the main light spot in a track direction along which the optical disc rotates, the sub beam being synchronized with the main beam; and
    an objective lens focusing the main beam and the sub beam on a recording surface of the optical disc,
    wherein the secondary light spot partially erases an existing mark and the main light spot completely erases the existing mark and records a new mark at a position of the erased mark during mark recording and/or erasing.

8. The optical recording apparatus as recited in claim 7, wherein
    the secondary light spot supports the erasing of the existing mark by partially erasing the existing mark while emitted at the predetermined distance ahead of the main light spot in the track direction along which the optical disc rotates during a recording signal period, and
    the main light spot completely erases the existing mark partially erased by the secondary light spot during the recording signal period.

9. The optical recording apparatus as recited in claim 8, wherein the secondary light spot is formed by branching pulse-type light output from the light source unit during the recording signal period, where the secondary light spot comprises a pulse form comprising a same variation as the recording signal.

10. The optical recording apparatus as recited in claim 7, wherein the light source unit comprises:
    a light source producing and emitting light; and
    an optical branching device branching the light emitted from the light source into the main beam and the sub beam.

11. The optical recording apparatus as recited in claim 10, wherein an optical erasing power of the main beam, Pme, and an optical erasing power of the sub beam, Pse, satisfy:

$Pme \leq Pse$.

12. The optical recording apparatus as recited in claim 11, wherein the optical erasing power of the main beam, Pme, is an invariable power comprising a predetermined magnitude, and the optical erasing power of the sub beam, Pse, is pulse-formed power.

13. The optical recording apparatus as recited in claim 7, wherein the light source outputs light comprising power that satisfies:

$$Pt=(Pm+Ps)/\alpha,\ 0 \leq \alpha \leq 99$$

wherein Pt comprises a total of light power output from the light source, Pm comprises the power of the main beam I, Ps comprises the power of the sub beam II, and a comprises α degradation in light efficiency caused by the branching of light into two beams.

14. The optical recording apparatus as recited in claim 7, wherein the light source unit comprises first and second light sources positioned in the track direction of the optical disc and emitting the main beam and the sub beam, respectively.

15. The optical recording apparatus as recited in claim 14, wherein
the first and second light sources operate in synchronization with each other and output light power comprising a same form but different magnitudes.

16. The optical recording apparatus as recited in claim 15, wherein
the secondary light spot partially erases the existing mark while emitted at the predetermined distance ahead of the main light spot in the track direction along which the optical disc rotates during a recording signal period, and
the main light spot completely erases the existing mark partially erased by the secondary light spot during the recording signal period.

17. The optical recording apparatus as recited in claim 14, wherein an optical erasing power of the main beam, Pme, and an optical erasing power of the sub beam, Pse, satisfy:

$$Pme \leq Pse.$$

18. The optical recording apparatus as recited in claim 17, wherein the optical erasing power of the main beam, Pme, is an invariable power comprising a predetermined magnitude, and the optical erasing power of the sub beam, Pse, is pulse-formed power.

19. The optical recording apparatus as recited in claim 7, wherein an optical erasing power of the main beam, Pme, and an optical erasing power of the sub beam, Pse, satisfy:

$$Pme \leq Pse.$$

20. The optical recording apparatus as recited in claim 19, wherein the optical erasing power of the main beam, Pme, is an invariable power comprising a predetermined magnitude, and the optical erasing power of the sub beam, Pse, is pulse-formed power.

21. The optical recording apparatus as recited in claim 20, wherein the predetermined magnitude of the invariable power is 2.2 mW to 2.4 mW.

22. The optical recording apparatus as recited in claim 7, wherein the main light spot and the secondary light spot projected on the optical disc are sufficiently separated from each other where the secondary light spot does not affect an area to be recorded on by the main light spot while erasing the existing mark.

23. The optical recording apparatus as recited in claim 7, wherein the predetermined distance between the main light spot and the secondary light spot on the optical disc is greater than a length of a minimum recording mark.

24. The optical recording apparatus as recited in claim 9, wherein the light source unit further comprises a light source to emit a light beam and an optical element which receives the emitted light beam and divides the received emitted light beam into the main beam and the sub beam.

25. The optical recording apparatus as recited in claim 24, wherein the optical element diffracts the emitting light beam to provide the main beam and the sub beam.

26. The optical recording apparatus as recited in claim 24, wherein the optical element comprises a diffraction grating.

27. The optical recording apparatus as recited in claim 24, wherein the optical element comprises a holographic element.

28. The optical recording apparatus as recited in claim 10, wherein the optical branching device is disposed in an optical path between the light source and the objective lens so as to branch the light emitted from the light source into the main beam and the sub beam.

29. The optical recording apparatus as recited in claim 28, wherein the optical branching device diffracts the emitting light beam to provide the main beam and the sub beam.

30. The optical recording apparatus as recited in claim 10, wherein the optical branching device comprises a diffraction grating.

31. The optical recording apparatus as recited in claim 10, wherein the optical branching device comprises a holographic element.

32. The optical recording apparatus as recited in claim 15, wherein the output light power of the first and second light sources have a same pulse duration.

33. An optical recording apparatus, comprising:
a light source unit emitting a main beam to form a main light spot on an optical disc and emitting a sub beam to form a secondary light spot on the optical disc at a predetermined distance ahead of the main light spot in a track direction along which the optical disc rotates; and
an objective lens focusing the main beam and the sub beam on a recording surface of the optical disc, wherein:
the secondary light spot partially erases an existing mark and the main light spot completely erases the existing mark and records a new mark at a position of the erased mark during mark recording and/or erasing,
the first and second light sources operate independently,
the first light source outputs pulse-formed recording light power and the second light source outputs DC erasing light power,
the secondary light spot comprises the DC erasing light power from the second light source and partially erases the existing mark, and
the main light spot comprises the DC erasing light power from the first light source and completely erases the existing mark partially erased by the secondary light spot, providing sufficient erasing ratio.

* * * * *

UNITED STATES PATENT AND TRADEMARK OFFICE
CERTIFICATE OF CORRECTION

PATENT NO. : 6,845,079 B2
DATED : January 18, 2005
INVENTOR(S) : Kyung-geun Lee et al.

It is certified that error appears in the above-identified patent and that said Letters Patent is hereby corrected as shown below:

Column 7,
Line 55, "snot" to -- spot --.

Column 9,
Line 10, change "a comprises $\alpha$" to -- a comprises a --.

Signed and Sealed this

Twenty-seventh Day of September, 2005

JON W. DUDAS
*Director of the United States Patent and Trademark Office*